(12) United States Patent
Lindsay et al.

(10) Patent No.: US 9,247,044 B2
(45) Date of Patent: Jan. 26, 2016

(54) REMOTE CONTROL AND CALL MANAGEMENT RESOURCE

(71) Applicants: Jeffrey James Lindsay, Great Falls, VA (US); Peter Stern, Riverside, CT (US)

(72) Inventors: Jeffrey James Lindsay, Great Falls, VA (US); Peter Stern, Riverside, CT (US)

(73) Assignee: Time Warner Cable Enterprises LLC, New York, NY (US)

( * ) Notice: Subject to any disclaimer, the term of this patent is extended or adjusted under 35 U.S.C. 154(b) by 216 days.

(21) Appl. No.: 13/832,787

(22) Filed: Mar. 15, 2013

(65) Prior Publication Data
US 2014/0273991 A1 Sep. 18, 2014

(51) Int. Cl.
*H04M 3/42* (2006.01)
*H04M 3/00* (2006.01)
*H04M 3/493* (2006.01)

(52) U.S. Cl.
CPC .............. *H04M 3/00* (2013.01); *H04M 3/493* (2013.01)

(58) Field of Classification Search
CPC ................................. H04M 3/00; H04M 3/493
USPC ........ 455/414.1; 370/352, 389, 401; 725/106, 725/133, 153
See application file for complete search history.

(56) References Cited

U.S. PATENT DOCUMENTS

| | | | |
|---|---|---|---|
| 6,236,653 B1 * | 5/2001 | Dalton et al. ................. | 370/352 |
| 8,869,227 B2 * | 10/2014 | Lafreniere et al. ............ | 725/133 |
| 2006/0140200 A1 * | 6/2006 | Black et al. ................... | 370/401 |

* cited by examiner

*Primary Examiner* — Amancio Gonzalez
(74) *Attorney, Agent, or Firm* — Chapin IP Law, LLC

(57) ABSTRACT

A call management resource in a cable network environment receives an incoming phone call from a cable network subscriber. Via a call connection between the call management resource and the subscriber, the call management resource receives control input from the subscriber over the call connection. The control input can be a command specifying an operation to be performed on behalf of the subscriber in the cable network environment. In accordance with the control input, the call management resource initiates execution of the operation in the cable network environment. Thus, a cable network subscriber can perform control functions in a cable network environment using a communication device.

24 Claims, 8 Drawing Sheets

CONFIGURATION
SETTINGS
150

| SUBSCRIBER NAME | TARGET PHONE NUMBER | SUBSCRIBER SETTINGS FOR STOCK QUOTES |
|---|---|---|
| JOHN DOE 108-1 | (617)453-0702 | AAPL, UTX, TWC, ... |
| JOSEPH SMITH 108-2 | (212)334-4592 | FB, CWGIX, TWC, ... |
| DAVID JOHNSTON | (607)754-1648 | N/A |
| ... | ... | ... |

FIG. 3

REMOTE CONTROL AND CALL MANAGEMENT RESOURCE

BACKGROUND

In accordance with conventional phone system technology, each phone device in a respective network is assigned a unique phone number. As is well known, to place a call to a target phone device, a phone user dials the phone number assigned to the target phone device using his own phone. The phone service provider receives the call request from the calling party and initiates a call alert in the phone network to the target phone device.

During the call alert, the target phone typically rings to indicate occurrence of an incoming call. If the target phone device goes unanswered, the calling party may end the attempt to reach the target phone device or the caller alert period (e.g., time when target phone rings) may time out. If the user of the target phone device accepts the incoming call (i.e., answers the phone), a two-way communication link is established between the calling party and target phone device.

In certain instances, the target phone device called by a user is operated by a business. In earlier days, when a phone user called a business, a human phone operator would redirect the call to an appropriate party within the business.

Conventional phone systems have been modified to include so-called IVR (Interactive Voice Response) technology. In accordance with IVR technology, the calling party typically provides input via pressing buttons on the phone or speaking a command into a phone. The IVR system receives the input over the call connection and converts the received input into one or more commands that are subsequently executed to carry out a respective local operation as specified by the received input. In certain instances, the IVR system includes resources to automatically execute the one or more commands, eliminating the need for a human phone operator.

BRIEF DESCRIPTION OF EMBODIMENTS

Embodiments herein are useful over conventional techniques. For example, one embodiment herein is directed to providing advanced control capabilities to subscribers in a cable network environment using a call management resource. The call management resource carries out one or more commands in the cable network environment based on input from a respective caller. In a further non-limiting example embodiment, the call management resource supports cross-platform control in which control input received over a phone device from a subscriber is converted into one or more packetized control messages transmitted to a computer device in a cable network environment.

More specifically, according to one embodiment, assume that a call management resource in a cable network environment receives an incoming phone call from a cable network subscriber. The network and equipment therein establishes a call connection between the call management resource and the subscriber. The call management resource then receives control input from the subscriber over the call connection. In one embodiment, the control input specifies an operation to be performed on behalf of the subscriber. In accordance with the control input, the call management resource initiates execution of the operation in the cable network environment. Thus, according to one embodiment, a cable network subscriber can perform control functions in a cable network environment using a phone device.

In certain instances, it may be desired that the phone number to access the call management resource is shortened to fewer than a standard ten digit phone number. For example, in one embodiment, a unique hotline sequence to establish the call connection with the access the call management resource can be fewer than seven digits. By way of a non-limiting example, the hotline can include a sequence of symbols (e.g., letters, numbers, etc.) such as one of the sequences "#", "*23", "822", "3333", "56789", etc. Pressing the sequence of buttons on the phone device results in a call connection with the call management resource. A user may provide input indicating what special sequence of buttons is to be pressed in order to connect with a respective call management resource.

The call management resource can be disposed inside or outside of a cable network environment and be configured to manage incoming calls to the designated hotline. For example, the call management resource can be configured to monitor and detect incoming calls to the hotline number. In response to detecting that the subscriber dials the appropriate multi-digit phone sequence (i.e., the hotline number) including fewer than seven digits, the call management resource establishes the call connection with the calling subscriber.

In accordance with further embodiments, note that subsequent to establishing the call connection and prior to receiving the control input, the call management resource can be configured to provide a voice-based notification over the call connection to the subscriber. For example, the voice-based notification generated by the call management resource and transmitted over the call connection to the subscriber can indicate one or more operations that can be selected for execution by the subscriber over the call connection. Accordingly, a cable network subscriber (or any other general user) can call the call management resource and be notified of available control options.

In yet further embodiments, a subscriber can control or configure different functionality that is to be available when accessing the call management resource. For example, in one embodiment, prior to receiving an incoming call to the subscriber, the call management resource can receive configuration information from the subscriber. In one example embodiment, the subscriber inputs the configuration information via a web page accessible to the subscriber. In such an instance, the configuration information inputted through the web page (or other suitable resource) specifies particular information to retrieve and audibly playback to the subscriber in response to the subscriber inputting an appropriate command to the call management resource.

A user can provide configuration information such as one or more stock symbols representing one or more stocks of interest. Via access to the call management resource, the subscriber is able to request audio playback of quotes for the one or more stock symbols of interest.

In a further non-limiting example embodiment, the control input such as a command received over a call connection with the call management resource can be a playback command. The playback command can indicate to audibly playback particular content such as current prices for the stocks symbols of interest. In response to receiving the playback command: the call management resource initiates retrieval of the requested information (such as current stock prices in the market for the pre-identified stock symbols) as text-based content. The call management resource converts the text-based content (e.g., current stock prices for the one or more stock symbols) into a respective audio signal. The call management resource initiates playback of the audible signal to the subscriber on a respective phone device.

In accordance with further embodiments, the input provided by a subscriber can indicate how to control a computer device, set-top box, etc. For example, the call management resource can be configured to process the control input received from the subscriber. The control input can specify how to control operation of a computer device disposed in a subscriber domain assigned to the subscriber. The subscriber domain can be one of multiple subscriber domains served by a shared communication link in the cable network environment.

Upon receipt of the control input from the subscriber over a respective call connection, the call management resource can be configured to map the input to an appropriate set of one or more command/control messages to carry out a task as indicated by the subscriber input. In such an instance, the call management resource then initiates transmission of the set of one or more corresponding command/control messages from the call management resource over the shared communication link to the computer device in the subscriber domain of the cable network environment. In this manner, a subscriber can control one or more computer devices in their subscriber domain.

By further way of a non-limiting example, the call management resource can receive the control input from the subscriber as a voice communication over the call connection. In such an instance, the call management resource can translate the voice communication into one or more control messages that are subsequently transmitted over the shared communication link to the computer device in the subscriber domain.

Translation of a received communication from a subscriber's phone device can include: mapping an identity of the corresponding subscriber to a network address associated with the subscriber domain; producing a control message to carry out a command inputted by a subscriber; and including the network address in the control message to route the control message to the subscriber domain in the cable network environment. Further information in the control message can indicate to which of one or more computer devices in the subscriber domain the control message is directed. Accordingly, a subscriber can indicate (e.g., via a voice command, pressing of buttons on a phone, etc.) a command to perform with respect to one or more devices in a subscriber domain. The call management resource converts one or more received commands over the phone connection into corresponding one or more control messages to execute the requested operations.

In accordance with yet further embodiments, the call management resource can be configured to store information received from one or more subscribers and make the stored information available over a phone connection. More specifically, in one embodiment, in accordance with input from a subscriber over a call connection, the call management resource can be configured to produce an itemized listing. The call management resource can receive input for the itemized listing from one or more entities (such as subscribers in the cable network environment, non-subscribers, etc.). The call management resource modifies the listing to include the input (such as one or more specified items) received from the one or more entities.

One or more subscribers can access the itemized listing. For example, in response to receiving a request, the call management resource provides the subscriber access to the listing. In one embodiment, a subscriber can call the call management resource to retrieve a rendition (e.g., audio rendition, visual rendition, etc.) of the itemized listing. The rendition enables the recipients to identify the items in the listing.

In yet further embodiments, the call management resource can receive control input from a user over a call connection such as a voice-based command uttered by the subscriber over the call connection. As previously discussed, in certain embodiments, the call connection can be established over a shared communication link of the cable network environment between the subscriber and the call management resource. As an example, the cable network environment can support phone services. A cable network subscriber can utilize the phone services to call other parties as well as communicate with the call management resource or interactive management system to execute different functions.

As previously discussed, the voice-based command can specify a specific operation to be performed in a subscriber domain of the cable network environment in which the subscriber resides. In a more specific embodiment, the call management resource translates the (potentially voice-based) input into one or more control commands encoded as one or more IP data packets that are used to control a respective target device. The call management resource transmits the packetized control commands over a shared communication link in a cable network environment to the subscriber domain to perform the operation as specified by the command.

Further embodiments herein include a call management resource and related equipment disposed in a network environment. In one embodiment, the call management resource detects activation of a phone device. Activation can be an off-hook condition, powering of a phone device, a window of time after powering the phone device but prior to the subscriber dialing a phone number into the phone device, etc.

In response to detecting the activation event, the call management resource obtains configuration information associated with a subscriber operating the phone device. The configuration information can specify whether a subscriber associated with the phone device subscribes to or has set the phone device to default to connecting with an interactive management service upon activation.

Assume in this example embodiment that the subscriber associated with the phone device does subscribe to being automatically connected to use of a respective interactive management system upon activating their phone device. In such an instance, as specified by the configuration information, and prior to an event such as the subscriber inputting a target number into the phone device to establish a call connection with a corresponding called party, the call management resource automatically establishes a communication connection between the phone device and an interactive management system. The interactive management system executes commands as inputted by the subscriber through the phone device over the communication connection.

Accordingly, upon merely activating a phone device, without dialing a sequence of numbers to connect with a respective destination (such as another phone device, an interactive voice response system, etc.) a subscriber can be automatically connected to a respective interactive management system as a default condition.

As discussed, other embodiments herein include dialing a pre-specified sequence of numbers on the phone device to connect to the interactive management system.

In accordance with another non-limiting example embodiment, the subscriber (or other user) activating the phone device can be notified that the interactive management system is available to perform one or more functions on behalf of the subscriber via a notification transmitted to the phone device over the communication connection such as voice or text based message "you are now connected to an interactive management system" played back on the phone device. Thus, in one embodiment, in lieu of transmitting a conventional dial-tone signal over the communication connection to the phone device for playback, the interactive management system or other suitable resource can be configured to provide a notification over the communication connection to the phone device indicating that the phone device has been connected to the interactive management system.

In accordance with further embodiments, the call management resource can initiate playback of a standard dial tone on the phone device to indicate that the user is able to make an outbound call to a called party even though the phone device is communicatively coupled to the interactive management system via the communication connection. In such an instance, the user of the phone device can merely speak into the phone device (or dial a sequence of buttons on the phone device) to communicate with the interactive management system and carry out desired commands.

Even though the subscriber is connected to the interactive management system in accordance with a default setting, and a dial tone is played back to the subscriber, the subscriber can dial a respective target phone number to establish a call connection. For example, while the phone device is connected to the interactive management system via the communication connection, in response to detecting input from the user dialing the target number on the phone device, embodiments herein include terminating the communication connection between the phone device and the interactive management system, and establishing the call connection as specified by the user inputted phone number between the phone device and the corresponding called party in the communication network. Thus, upon initial activation of the phone device, a subscriber can be connected directly to the interactive management system, but make an outbound call as usual to a target phone number without being inconvenienced by having to input a command to terminate the communication connection to the interactive management system.

If desired, the subscriber can be required to provide appropriate input to notify the interactive management system that the call is to be placed with a target phone device.

In one non-limiting example embodiment, via the default communication connection automatically established between the phone device and the interactive management system, the user inputs (e.g., by speaking, by texting, etc.) one or more commands into the phone device. The communication connection conveys the commands to the interactive management system. The interactive management system can translate the received input commands into appropriate machine executable commands. To carry out a requested command, the interactive management system can locally initiate execution of the machine executable commands to carry out one or more operations as specified by the input. Carrying out a command can include transmitting a response over the communication connection for audio playback on the phone device.

Additionally or alternatively, the interactive management system can transmit the machine commands to an appropriate resource at a remote location in the network to carry out execution of the command.

In a further specific non-limiting example embodiment, the interactive management system can be an interactive voice response system. The subscriber can speak an audio phrase (e.g., a code, command, selection option, etc.) into the phone device. The interactive voice response system receives the spoken input (e.g., spoken phrase) over the communication connection. The interactive voice response system processes the input and obtains appropriate information from a repository to satisfy the input. The interactive voice response system transmits one or more communications (to satisfy the user request) over the communication connection to the phone device over the communication connection in response to receipt of voice-based commands from the subscriber speaking into the phone device.

Accordingly, embodiments herein can include conveying a command from the subscriber operating the phone device over the communication connection to the interactive management system; and conveying a response generated by the interactive management system over the communication connection to the phone device.

In yet further embodiments, a subscriber may be amenable to receiving advertisements prior to being automatically connected to the interactive management system or prior to being allowed to use the interactive management system to carry respective one or more operations. For example, the call management resource (or other suitable resource in the network) can be configured to initiate playback of one or more voice-based or text-based advertisements to the phone device over the call communication prior to providing the subscriber access to the interactive management system or establishing the call connection with the corresponding called party. In such an instance, the subscriber may be charged a lower fee or no fee to use the interactive management system or make a subsequent outbound phone call.

Note that the phone device may be coupled to a land-line in a subscriber domain of a cable network environment. One end of the land-line is coupled to the phone device; the other end of the land-line is coupled to a corresponding modem device (such as an embedded media terminal adapter) in the subscriber domain. The modem is communicatively coupled (via use of a shared communication link) to a call handler terminal such as a cable modem termination system in the cable network environment.

A call management resource in the cable network environment can be configured to detect activation of the phone device via communications from the modem (or EMTA) through the cable modem termination system to the call management resource. In other words, upon detecting activation of the phone device, the cable modem termination system notifies the call management resource (such as a phone switch) of the event. In one embodiment, the modem (i.e., a call handler terminal in the subscriber domain) detects activation of the phone device. The call handler terminal (such as EMTA, modem, etc.) is assigned a respective unique network address such as a MAC (Media Access Control) address. The call handler terminal (or other suitable resource detecting the activation of the phone device) communicates the activation and the corresponding unique network address of the modem through the cable modem termination system to the call management resource.

Via the received communications, the call management resource identifies the unique network address associated with the phone device. To determine whether the phone device and respective caller should be automatically connected to the interactive management system based on detecting the off-hook condition, the call management resource maps the unique network address (associated with the call) to the configuration information associated with the corresponding subscriber. As discussed, the configuration information indicates whether or not the phone device should be connected to the interactive management system as a default.

Assume that the configuration information indicates that the subscriber has chosen to automatically connect to the interactive management system as a default upon activation of the phone device. In response to detecting this setting as specified by the configuration information for the subscriber, the call management resource establishes the communication connection between the phone device and the interactive management system. As mentioned, prior to making an outbound call, the user of the phone device is able to perform one or more functions as supported by the interactive management system.

Note that if a respective subscriber of a phone device does not set a default to automatically connect to the interactive management system upon activation of the phone device, embodiments herein include initiating playback of a conventional audio dial tone to the user of such a phone device. To connect to the interactive management system, the user in such an instance may be requested to input a special code as discussed above.

The configuration information to determine whether to connect to the phone device to the interactive management system as a default setting can be provided and/or controlled by a respective subscriber. For example, in one embodiment, prior to the call management resource detecting the activation of a phone device, the subscriber is able to use a respective computer device to access a respective web page from a server. The web page allows the respective subscriber to control settings of his respective phone system. As mentioned, one setting the subscriber can choose is to automatically connect a respective phone device to the interactive management system upon mere activation of the phone device. This alleviates the user of the phone device from having to input a special command to connect to the interactive management system each time the subscriber uses his phone device. The server receives the configuration information from the subscriber via the web page over a respective network connection. The server stores the configuration information in a repository accessible to the call management resource.

In accordance with yet further embodiments, a subscriber may choose a setting in which the phone device does not automatically connect to the interactive management system upon detecting activation of the phone device. Instead, a user may be requested to provide an input such as "please connect to the interactive management system" into the phone device in order to be connected to the interactive management system.

These and more detailed embodiments are discussed below.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, one or more memory chips, etc., or other non-transitory media such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by at least one processor of a respective computer device, cause the processor or multiple processors of the system to: at a call management resource in a cable network environment, receive an incoming phone call from a subscriber; establish a call connection between the call management resource and the subscriber; receive control input from the subscriber over the call connection, the control input specifying an operation to be performed on behalf of the subscriber; and in accordance with the control input, initiate execution of the operation in the cable network environment.

Another embodiment includes a computer readable storage medium and/or system having instructions stored thereon. The instructions, when executed by at least one processor of a respective computer device, cause the processor or multiple processors of the system to: detecting activation of a phone device; obtaining configuration information associated with a subscriber operating the phone device; and as specified by the configuration information, and prior to the subscriber inputting a target number into the phone device to establish a call connection with a corresponding called party, establishing a communication connection between the phone device and an interactive management system, the interactive management system executing commands as inputted by the subscriber through the phone device over the communication connection.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for use in the field of phone or voice based control. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 3 is an example diagram illustrating receipt and storage of configuration information associated with multiple subscribers according to embodiments herein.

DETAILED DESCRIPTION AND FURTHER SUMMARY OF EMBODIMENTS

Figure 1:
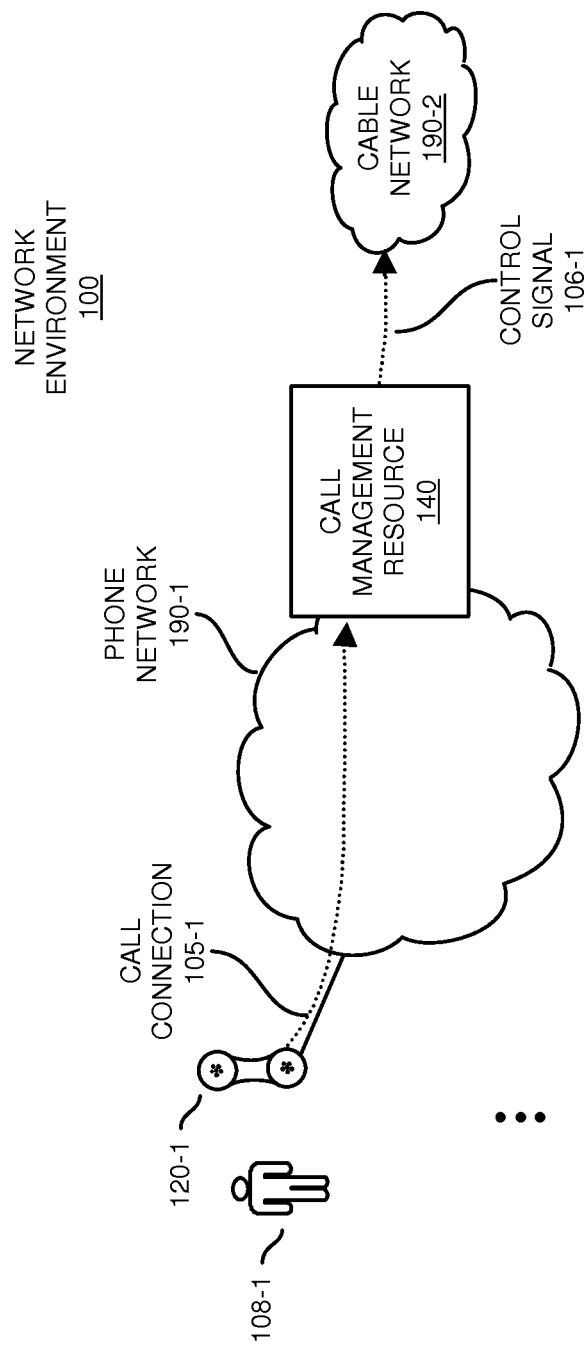
FIG. 1 is an example diagram illustrating a technique of controlling one or more devices in a cable network environment via an incoming call according to embodiments herein.

Now, more specifically, FIG. 1 is an example diagram illustrating a technique of providing control in a cable network environment via an incoming call according to embodiments herein.

As shown, the network environment 100 in FIG. 1 includes user 108-1. By way of a non-limiting example, the user 108-1 can be a cable network subscriber that subscribes to services (e.g., Internet services, cable television services, phone services, etc.) in cable network 190-2.

The user 108-1 operates communication device 120-1 such as a phone device to control one or more aspects of cable network 190-2. For example, to initiate control, the user 108-1 initiates a call connection 105-1 over phone network 190-1 to the call management resource 140. In one embodiment, the user 108-1 dials an appropriate phone number of the call management resource 140 to make the call connection 105-1.

Upon receipt of an incoming call, the call management resource 140 can authenticate and/or verify the user 108-1 and/or call connection 105-1 in any number of ways. For example, the call management resource 140 may require that the user 108-1 provide an appropriate identity and/or password; the call management resource can verify a unique identifier value (e.g., phone number) assigned to the communication device 120-1, and so on.

In accordance with further embodiments, subsequent to authentication/verification of the user 108-1 and/or communication device 120-1, the call management resource 140 enables the user 108-1 to control one or more aspects of the cable network 190-2.

To initiate control over the call connection 105-1, the user 108-1 inputs any of multiple different types of data such as voice commands to the communication device 120-1, depresses buttons of the communication device 120-1, etc. The communication device 120-1, in turn, communicates the control signals (e.g., representing voice commands, button presses, etc.) to the call management resource 140 over the established call connection 105-1.

The call management resource 140 processes the control input received from the user 108-1 over the call connection 105-1. In one embodiment, the control input specifies one or more operations to be performed on behalf of the user 108-1.

The call management resource 140 processes the received input. This can include decoding the received input to identify operations to be performed. In accordance with the control input, the call management resource 140 initiates execution of the one or more operations (associated with the one or more inputted commands) in the cable network 190-2.

In certain instances, it may be desired that the phone number used by the user 108-1 to establish the call connection 105-1 and access the call management resource 140 is shortened to fewer than a standard ten digit phone number. In other words, conventional phone systems typically require that a caller dial a ten-digit number to route a phone call. Use of a shortened phone sequence (e.g., a sequence including fewer than ten or seven digits) makes it possible for the user 108-1 to more quickly access the call management resource 140 and control one or more devices in the cable network 190-2.

As a more specific example, in one embodiment, a unique hotline sequence to establish the call connection with the access the call management resource can be fewer than seven digits. By way of a non-limiting example, the hotline can include a sequence of symbols (e.g., letters, numbers, etc.) such as *23. When the user 105-1 dials the sequence of symbols *, 2, and 3, the phone network 190-1 recognizes this as an attempt by the user 108-1 to establish a call connection with the call management resource 140. In response to receiving this input or other suitable command, the phone network 190-1 establishes the call connection 105-1 with the call management resource 140.

In one embodiment, note that the phone network 190-1 may be part of the cable network 190-2. In other words, the cable network 190-2 may offer phone services. The call management resource 140 can be located in the cable network 190-2. In response to detecting that a user 108-1 dials the appropriate multi-digit phone sequence (i.e., the hotline number to access the call management resource 140), the call management resource 140 and/or phone network 190-1 establishes the call connection 105-1 with the calling subscriber.

Note that subsequent to establishing the call connection 105-1 and prior to receiving control input from the user 108-1, the call management resource 140 can be configured to provide a voice-based notification over the call connection to the user. The voice-based notification generated by the call management resource 140 can indicate one or more operations that can be selected for execution by the user 108-1 via the call connection 105-1. Accordingly, a cable network subscriber such as user 108-1 (or any other general user) can establish a call connection with the call management resource 140 and be notified of available control options. As mentioned, control input from the user 108-1 specifies how to control one or more of the user's devices or services in cable network 190-2.

Figure 2:
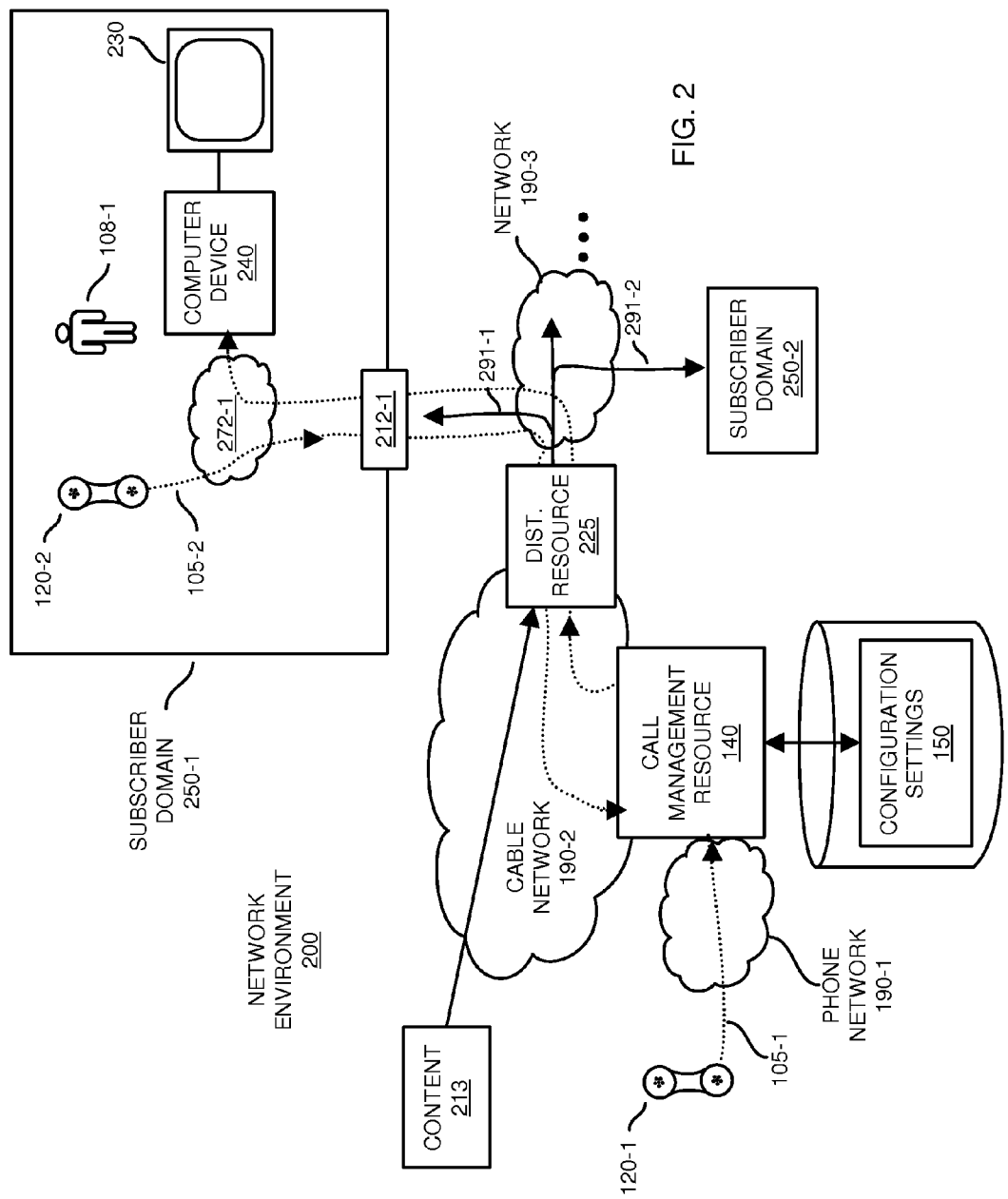
FIG. 2 is an example diagram illustrating use of a phone device to control one or more computer devices in a respective subscriber domain according to embodiments herein.

FIG. 2 is an example diagram illustrating more specific use of a communication device to control one or more computer devices in a respective subscriber domain according to embodiments herein.

In this example embodiment, network environment 200 includes phone network 190-1, cable network 190-2, distribution resource 225, shared communication link 291, and multiple subscriber domains 250 (e.g., subscriber domain 250-1, subscriber domain 250-2, etc.).

In general, the distribution resource 225 (e.g., a distribution node) provides subscribers access to available content 213 (e.g., over-the-top content from $3^{rd}$ parties, content made available to subscribers by the cable network service provider, etc.).

In addition to providing content access, the distribution resource 225 can be configured to support other cable network services. By way of a non-limiting example, network 190-3 can be a shared cable network in which available content 213 is delivered over multiple channels (e.g., scheduled television channels, switched digital video channels, on-demand channels, etc.) to one or more subscriber domains 250 (e.g., subscriber domain 250-1, subscriber domain 250-2, etc.).

Each of the subscriber domains 250 can include one or more computer devices (e.g., content management devices such as set-top boxes, personal computers, iPad™ devices, etc.) that selectively tune to one or more of the multiple channels available on shared communication link 291. Each of the computer devices can be configured to store and/or play back respective content 213 to a subscriber.

In this non-limiting example, each of the subscriber domains 250 receives multiple channels of available content 213 transmitted over shared communication link 290 (e.g., a coaxial cable, fiber, wireless link, twisted wire pair, etc.). The content 213 can be encoded in accordance with one or more different streaming protocols. Terminal ends (e.g., 291-1, 291-2, . . . ) of shared communication links 291 branch off into each subscriber domain 250 such that each of one or more of the subscriber domains 250 has access to the multiple channels of content distributed by distribution resource 225.

The subscriber domains 250 in cable network 190-3 can represent a service group of subscribers having access to a common set of encoded signals, although the different subscribers may have different access privileges or access rights with respect to decoding of the available channels on the shared communication link 291.

Note that, in addition to standard downstream television channels to subscribers, each of communication links 291 can support one or more DOCSIS (Data Over Cable Service Interface Specification) channels in an upstream direction. Via the DOCSIS channels, respective subscribers in the subscriber domains 250 are able to communicate upstream and establish web connections for retrieval of so-called over-the-top content form servers in the Internet. In one embodiment, over-the-top content includes broadband delivery of video and audio without the cable network service provider being involved in the control or distribution of the content itself. With respect to over-the-top content, the cable network provider may be aware of the contents of the IP packets, but is not necessarily responsible for, nor able to control, the viewing abilities of the subscribers.

In this non-limiting example embodiment, the subscriber domain 250-1 includes user 108-1 (e.g., a cable network subscriber), communication device 120-2, a network interface 212-1, a computer device 240 (e.g., set-top box, personal computer, iPad™, etc.), and one or more display devices such as display device 230.

Network 272-1 (e.g., a local area network, WiFi network, home network, etc.) in subscriber domain 250-1 provides connectivity between the shared communication link 291-1 and one or more devices located therein. Via network 272-1 and communication interface 212-1, the computer devices in subscriber domain 250-1 can communicate with each other as well as communicate over shared communication link 291-1 with the remote distribution resource 225 to retrieve content.

As previously discussed, the content 213 can be any suitable type of media (e.g., audio data, video data, streaming data, linear television programs, video on demand, IP television, web pages, etc.). Via input from the user 108-1, the computer device 240 can be selectively tuned amongst the multiple available channels to play back selected streaming content on display device 230 located in subscriber domain 250-1.

Each of subscriber domains 250 can be configured in a similar manner for retrieval and playback of available content 213.

As previously discussed, embodiments herein can include enabling the subscriber 108-1 to control one or more resources or services (to which the user 108-1 subscribes) in a cable network environment using a respective communication device 120.

More specifically, in one embodiment, assume that the user 108-1 initiates a call connection 105-2 with the call management resource 140. The call connection 105-2 can be established over a cable network phone service to which the user 108-1 subscribes. In such an instance, at least a portion of the bandwidth of the shared communication link 291 is dedicated to support phone connectivity between communication device 120-2 and other phones devices in network 190-1. Thus, in one embodiment, the call connection 105-2 can be established over a shared communication link 291-1 of the cable network 190-3 between the user 108-1 and the call management resource 140.

In a further embodiment, the user 108-1 uses the communication device 120-2 to control one or more devices in the subscriber domain 250-1. For example, via dialing an appropriate sequence of symbols assigned to the call management resource 140, the user 108-1 can establish the call connection 105-2 with the call management resource 140. By way of a non-limiting example, the phone call connection request can be handled in any suitable manner known in the art.

In a manner as previously discussed, via control input received from the user 108-1 over call connection 105-2, the user 108-1 can control one or more devices in subscriber domain 250-1. For example, the call management resource 140 can receive control input (e.g., a voice-based command, pressing of buttons on the communication device 120-2, text-based messages, etc.) from the user 108-1 over the call connection 105-2.

As previously discussed, the control input received by the call management resource 140 over the call connection 105-2 can specify one or more specific operations to be performed in subscriber domain 250-1 in which the user 108-1 resides. In such an instance, the call management resource 140 translates or maps the control input into one or more control messages. The call management resource 140 transmits the control messages over a dedicated one or more channels of communication link 291-1 to the subscriber domain 250-1 to perform the operation(s) as specified by the control input received over call connection 105-1.

One embodiment herein can include mapping an identity of the user 108-1 and/or communication device 120-2 to a corresponding subscriber domain. For example, the call management resource 140 may receive a call from communication device 120-2. The call management resource 140 can determine a unique identity of the communication device 120-2, user 108-1, etc., based on one or more parameters such as the phone number of the communication device 120-2 used to make the call connection 105-2, unique identity information inputted by the user 108-1, etc.

The call management resource 140 maps the unique identifier value of the user 108-1 or communication device 120-2 to a network address of the subscriber domain 250-1 controlled by the user 108-1. In one example embodiment, the network address specifies an address in which to communicate with the communication interface 212-1 and/or computer device 240 in subscriber domain 250-1.

The call management resource 140 produces one or more corresponding control messages depending on the control input received from the user. For example, assume that the control input over call connection 105-2 indicates that the user 108-1 would like to record a particular program on their set-top box (e.g., computer device 240) located in subscriber domain 250-1. In such an instance, the call management resource 140 produces one or more control messages directed to the computer device 240. If the control input is an utterance from the user 108-1, the call management resource 140 translates the received utterance into text. The text is then used as a basis to determine one or more operations intended by the user 108-1.

The control messages produced by the call management resource 140 can include any information such as a specific program to be recorded, a time to record the specified program, etc.

By way of a non-limiting example, note that configuration settings 150 can be configured to store information such as a mapping a subscriber to a respective subscriber domain, network addresses of each device in a respective subscriber domain, etc. Via configuration settings 150, the call management resource 140 can determine appropriate network addresses of target devices in which to forward command information.

To ensure proper delivery of the control messages to communication interface 212-1 and/or computer device 240, the call management resource 140 can be configured to produce the one or more control messages to include the network address information of the communication interface and/or computer device 240 as specified by the configuration settings 150. In other words, the computer device can be assigned a particular network address. Via communication of one or more commands from distribution resource 225 over shared communication link 291-1, the resource 212-1 is able to receive commands directed to resources in the subscriber domain 250-1. The configuration information indicates the appropriate unique network address to use as a basis to forward a respective command.

More specifically, the call management resource 140 transmits the control messages over cable network 190-2 to distribution resource 225. In one embodiment, distribution resource 225 includes a cable modem termination system. The distribution resource 225 determines which of multiple service groups in which the subscriber domain resides and selects the appropriate shared communication link amongst multiple shared communication links on which to transmit the control messages. In this instance, the distribution resource 225 transmits or routes the control messages over the shared communication link 291-1 to the communication interface 212-1.

Communication interface 212-1 resolves the received control messages and forwards the control messages over network 272-1 to the appropriate target device (e.g., computer device 240 in this instance) in subscriber domain 250-1.

Accordingly, embodiments herein can include: mapping an identity of the user 108-1 and/or communication device 120-2 subscriber to a network address associated with the subscriber domain 250-1; producing one or more control messages to carry out a command inputted by a user 108-1; and including the network address in the one or more control messages to route the control messages to the appropriate target (e.g., subscriber domain 250-1) in the cable network 190-3.

In one embodiment, the control messages produced by the call management resource 140 are one or more data packets transmitted to a target device (e.g., computer device) in accordance with an Internet Protocol. Thus, embodiments herein can include receiving control input (e.g., voice-based input, text, pressing of buttons, etc.) over a call connection and converting the received control input into one or more data packets (control messages) that are transmitted over a packet-switched network to an intended target device.

Note that control of the cable network environment is not limited to receipt of commands from a communication device 120-2 disposed in the subscriber domain 250-1. In accordance with further embodiments, the user 108-1 may be physically located outside of the subscriber domain 250-1 (such as a home network environment). In such an instance, the user 108-1 can initiate a call over phone network 190-1 (e.g., cell phone network, WiFi network, plain old telephone system, voice over IP, etc.) in a manner as previously discussed to access the call management resource 140. Via control input received from the user 108-1 (or other party) over call connection 105-1 to the call management resource 140, the call management resource 140 controls one or more devices in subscriber domain 250-1 in a manner as discussed above.

In accordance with yet further embodiments, note that the user 108-1 can request any type of information from call management resource 140. For example, via a voice request from a respective user 108-1 into communication device 120, the user 108-1 can request information such as stock quotes, sports scores, weather, search engine requests, etc.

Note that the communication device operated by the user 108-1 can be any suitable device and is not limited to a phone. Results of a respective request can be returned audibly through, e.g., the speakers of the communication device used to make the request or other audio output device in subscriber domain 250-1.

Alternatively or additionally, in response to a request, the results of the request generated by the call management resource 140 can be displayed on display screen 230 in subscriber domain 250-1, played back through speakers in subscriber domain 250-1, displayed on display screen of the communication device 120-2, etc.

When displaying information on a cross-platform device (with respect to communication device 120-2) such as display screen 230, in a manner as previously discussed, the appropriate network address of the computer device 240 can be used to route the display information to computer device 240 for display on display screen 230. For example, a user 108-1 can request information via a command inputted over connection 105-2 to the communication device 120-2. Call management resource 140 can be configured to process the request in a manner as previously discussed. For example, the call management resource 140 obtains appropriate information as specified by the request. In a manner as previously discussed, the call management resource 140 initiates transmission of the display information to the computer device 240 using an appropriate network address assigned to the computer device 240. Computer device 240 receives and plays back the display information on display screen 230 for viewing by the user 108-1. Accordingly, the user 108-1 can use a phone device to request what information is to be displayed on the respective display screen 230.

Additional options supported by the call management resource 140 can include the ability to dictate emails or text messages, which could be repeated back to the user 108-1 before sending and/or displayed on a viewing device. For example, inputted speech from the user 108-1 can be converted to text for a message. The text can be translated back into speech and transmitted to the user, enabling the user to verify whether the speech to text portion of generating the message worked properly.

Also, incoming emails and texts to the user 108-1 from other sources (e.g., other users) can be converted to speech by the call management resource 140 for consumption (e.g., viewing, audible playback, etc.) by the user 108-1.

Additional services supported by the call management resource 140 can include enabling (via voice or other suitable type of input) the user 108-1 to: program a digital video recorder, ask for TV recommendations, find out what others are watching on television, etc.

The service supported by call management resource 140 can be presented as an add-on to a customer's existing package of cable network services and, in addition to providing a subscriber with convenience and an incentive to maintain his/her cable network voice service, would enable the handicapped and elderly persons to take full advantage of modern-day communication and information systems. That is, physically challenged users can use communication device 120 to perform control operations as discussed herein.

FIG. 3 is an example diagram illustrating receipt and storage of configuration settings information according to embodiments herein.

As discussed herein, a user 108-1 can communicate with the call management resource 140 to control one or more devices in a cable network environment. In addition to controlling devices and/or a cable network environment, the call management resource 140 can be configured to deliver requested content to the user 108-1 over a respective call connection.

As an example, the user 108-1 can establish the call connection with the call management resource 140. The call management resource 140 can provide notification to the user (such as via as a voice-based audio signal) of the different options that can be selected by the user 108-1. More specifically, the call management resource 140 can playback the voice signal: "choose from the following menu: to select a weather report, say or select the number 1; to select playback of e-mails, say or select the number 2; to select playback of stock quotes, say or select the number 3; . . . "

Assume that the user 108-1 speaks the number three into the communication device to select option 3 in the menu. In response to receiving the selection to playback stock quotes, the call management resource 140 can retrieve current stock prices for one or more stock symbols, convert the stock prices to a voice-based signal, and playback the voice-based signal back to the requesting user 108-1.

In one embodiment, the user 108-1 can control or configure different functionality that is to be available when accessing the call management resource 140. For example, in one embodiment, prior to receiving an incoming call to the user 108-1, the call management resource 140 can receive and store configuration information associated with the user 108-1.

One way the user 108-1 can input configuration information is to visit a web site. For example, the user 108-1 can visit a web page sponsored by a respective service provider. Via the web page, the user 108-1 inputs information such as one or more stock symbols of interest. Such information can be stored as configuration settings 150. As previously discussed, call management resource 140 has access to configuration settings 150 to determine which information to playback to the respective user 108-1 upon selection of an option (e.g., option number 3) such as playback stock quotes.

As shown in FIG. 3, assume in this example that the user 108-1 previously inputted the stock symbols AAPL, UTX, TWC, etc., as the stock symbols to provide quotes when requested during a subsequent call connection.

During a subsequent call connection, via appropriate control input from the user 108-1 during the call connection, assume that the user 108-1 requests audio playback of current prices (i.e., option 3) for the pre-specified one or more stock symbols of interest (i.e., AAPL, UTX, TWC, etc.).

In response to receipt of this playback command from user 108-1, the call management resource 140 accesses configuration settings 150 to identify the pre-specified stock symbols of interest. On behalf of the user 108-1, the call management resource 140 initiates retrieval of the requested information (such as current stock prices for the pre-identified stock symbols AAPL, UTX, TWC, etc.) as text-based pricing information from an appropriate stock quote source such as CBS Marketwatch™. The call management resource 140 converts received text-based pricing information for the pre-specified stocks into a respective voice-based audio signal. The call management resource initiates playback of the voice-based audio signal over the call connection to the user 108-1, informing the user 108-1 of the latest stock process for pre-specified symbols AAPL, UTX, TWC, etc.

Accordingly, a user 108-1 can pre-specify one or more stock symbols of interest prior to a call connection. Thereafter, during a call connection, the user 108-1 can request stock quotes and listen to an audio playback of stock price information for symbols AAPL, UTX, TWC, etc.

Figure 4:
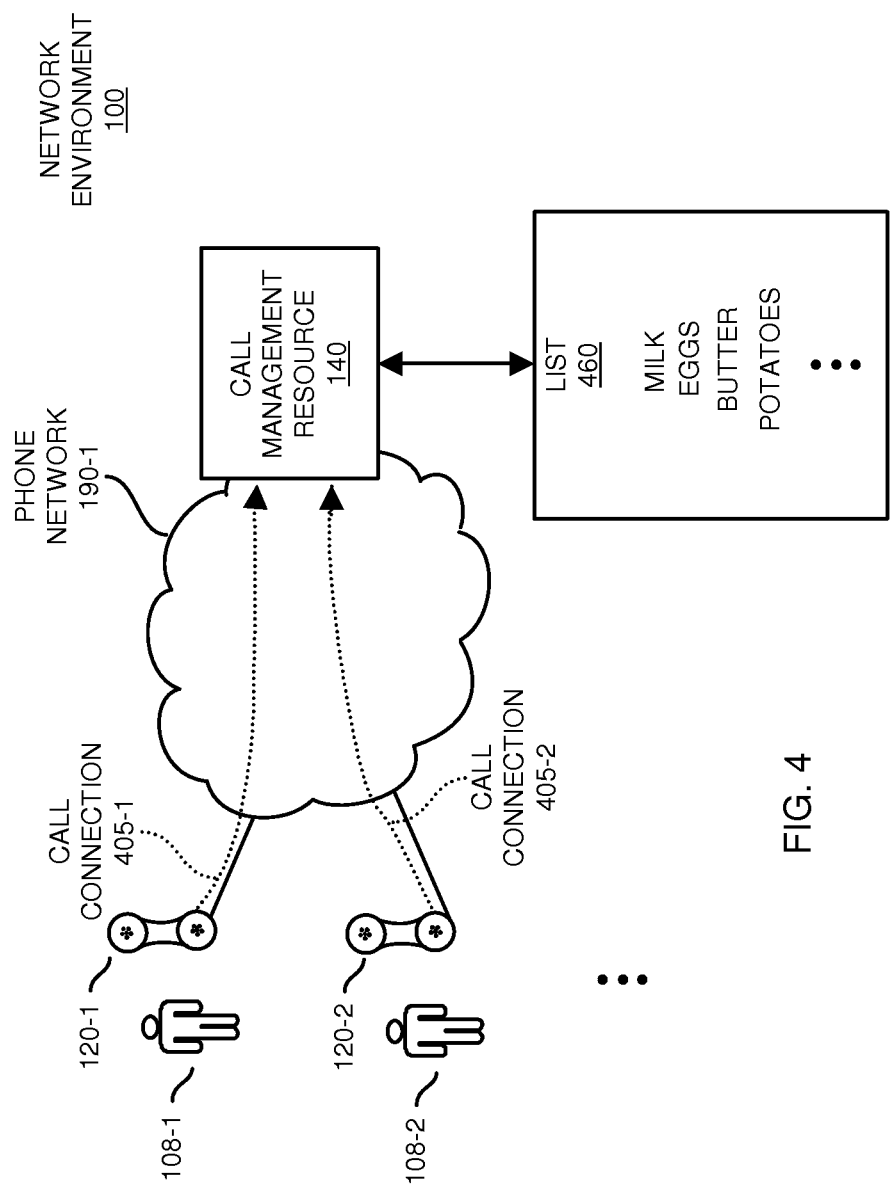
FIG. 4 is an example diagram illustrating management and access to a shared list according to embodiments herein.

FIG. 4 is an example diagram illustrating management of a shared list according to embodiments herein.

In accordance with further embodiments, the call management resource 140 can be configured to store information received from one or more subscribers and make the stored information available over one or more different phone call connections.

More specifically, in one embodiment, in accordance with phone input received from a subscriber over a call connection, the call management resource 140 can be configured to produce an itemized listing 460. The call management resource 140 can receive input for the itemized listing 460 from one or more different entities (such as subscribers in the cable network environment, non-subscribers, etc.) at different times.

Based on the input, the call management resource 140 modifies the itemized listing 460 to include the input (such as one or more specified items) received from the one or more entities. In this example, assume that user 108-1 initiates a call connection 405-1 to call management resource 140. During the call connection 405-1, assume that the user speaks the words "milk" and "eggs" for inclusion in the itemized listing 460. In response to receiving such input, the call management resource 140 adds the words or appropriate symbols "milk" and "eggs" to the itemized listing 460.

Assume further in this example that the user 108-2 initiates a call connection 405-2 to call management resource 140. During the call connection 405-2, assume that the user speaks the words "butter" and "potatoes" for inclusion in the itemized listing 460. In response to receiving such input, the call management resource 140 adds the words "butter" and "potatoes" to the itemized listing 460.

In this manner, any of one or more users is able to add items to (or delete one or more items from) the itemized listing 460.

One or more subscribers can access the itemized listing via communications with call management resource 140. For example, in response to receiving a request from user 108-1 operating the communication device 120-1, the call management resource 140 provides the subscriber access to the itemized listing 460. In other words, the user 108-1 can access the call management resource 140 to hear an audio playback of the itemized listing 460. As a more specific example, the user 108-1 can speak a command such as "playback itemized listing." In response to receiving this command, the call management resource 140 translates the itemized listing 460 into a speech signal and plays back the words: "The itemized listing includes: milk, eggs, butter, potatoes, . . . " to the user 108-1 over the respective call connection.

Additional Embodiments:

In accordance with yet further embodiments, the call management resource 140 can support additional functionality. For example, the call management resource 140 can be configured to provide information services that allow the user (e.g., caller) to access a variety of information services. Any or all of the following information services can be provided to a caller in a number of different ways.

For example, the call management resource 140 can receive a request (e.g., via a spoken command, pressing of one or more buttons, etc.) from the user 108-1 to play back requested information as an audio output on a communication device such as a phone. In response to the request, the call management resource 140 can retrieve appropriate web page information and translate corresponding text in the web page into the audio output. Other embodiments can include, as specified by the request, obtaining appropriate encoded audio information from a respective repository and initiating playback of the encoded audio as an audio output from the communication device 120-1.

Information services supported by the call management resource 140 can further include providing the following audio information in response to receiving a request from the user:

obtaining and playing back exact current time information to a caller obtaining and playing back National weather conditions and forecasts to a caller obtaining and playing back Storm tracking information to a user obtaining and playing back Power outages and expected fix times to a caller obtaining and playing back Local weather conditions to the caller obtaining and playing back School closing and community information to a caller obtaining and playing back National News headlines information to a caller obtaining and playing back Local news information to a caller obtaining and playing back Business news information to a caller obtaining and playing back Travel timetables—airlines, trains and buses—e.g. the call management resource 140 can play back the phrase "number 405 bus will arrive at your destination in 5 minutes" Many buses now carry GPS and report their positions to a central monitor system. The call management resource 140 can obtain relevant information and provide notices of whether the bus is on time, when the bus will arrive, etc.

obtaining and playing back Cinema, theatre, and events schedule information to a caller obtaining and playing back Sports fixtures and results to a caller obtaining and playing back Lottery results to a caller obtaining and playing back Election details, locations, and results to a caller obtaining and playing back Health news—e.g. flu alerts, meningitis alerts, lice alerts in local schools (those were the days)—to a caller obtaining and playing back local Crime statistics (e.g. "there were 2 murders yesterday evening 100 yards from your front door") to a caller obtaining and playing back Sex offender register information to a caller (e.g., in accordance with local statutes, the information can indicate that there is a convicted child molester living two blocks from your current location)

obtaining and playing back, to a caller, identities of closest liquor store open at a particular time of day obtaining and playing back, to a caller, closest dispensary of medicine obtaining and playing back, to a caller, back business news—headlines information, quotes for user-specified stocks, etc.

obtaining and playing back, to a caller, local sports events information at any level such as from professional soccer down to school or town soccer teams obtaining and playing back, to a caller, community events—e.g. retirement seminars at local community colleges, etc.

obtaining and playing back, to a caller, restaurant recommendations and reviews obtaining and playing back TV Guide information to a caller obtaining and playing back Real estate listing information to a caller Advertisements and Recommendations In accordance with further embodiments, the call management resource 140 can accommodate:

playback of controlled sponsor messages in specific categories such as restaurants, supermarkets, etc.

playback of local business advertisements such as those associated with auto insurance, financial advisors, etc.

playback of advertisement of local shops and trades—e.g. plumbers, septic tank services etc.

access to restaurant and professional recommendations for particular areas of interest providing notification such as "According to Yelp, the top rated dentist in your zip code is . . . "

purchasing of goods and services obtaining information as parking time on local meters provide ticket access to events and places—e.g. cinema, theatre etc and receive access codes in lieu of physical tickets activation of vending machines ordering of pre-set deliveries—(e.g., prescriptions, groceries, etc.)

accessing Adult services (900 numbers etc) with user-completed gateways to verify age and identity of the caller accessing gambling and betting Entertainment In accordance with further embodiments, the call management resource 140 can accommodate access to:

Audio Games—word games—audio crosswords, Jeopardy-type games (pre-programmed by us or a suitable vendor)

Audio stories, plays and soap operas (like BBC Radio 4 in the UK—for example http://www.bbc.co.uk/programmes/b006qpgr)

Adult entertainment (see Goods and Services)

Audio books

Music

Radio channels (will need deals obviously to access the content)

Sports events and matches—latest scores and live commentary will need deals with the sports franchises etc)

Spiritual messages and Inspiration

Bible quote of the day

Torah lesson of the day

Political quote for the day " . . . from my cold dead hands"

Inspirational quotes for the day ""I'm good enough. I'm smart enough. And doggone it, people like me."

Posts on social media sites by audio command

Audio Foursquare location posts

Audio Tweets

Voting and Quizzes—For example, the call management resource 140 can be configured to playback the audio: "Do you think congress should let the economy go over the fiscal cliff? Press 1 for yes, 2 for no, 3 for maybe and keep track pf poll results.

Notification of alerts Alert user to posts on social media sites

The call management resource 140 can be used to access messages, calendars and contacts to perform operations such as:

Read back emails, voicemails and SMS texts from user-specified accounts

Take dictation of messages and texts from the phone to user-specified email accounts and phone numbers Access user-specified contact lists for names and addresses Check meeting schedules and/or schedule meetings Set alarms, reminders and task lists Voice activation/interactive health services (the user presets permissions, height, weight and general health conditions online)

Receive health information from a caller.

Program and monitor devices (ties to Intelligent home etc)

Program one or more DVRs by audio input from the caller—e.g. the user can input a command record "Downton Abbey—Episode 6 at 9.00 pm on channel 522.

The call management resource 140 can be used to obtain alert information and audibly playback the alert to a respective caller. The call management resource 140 can receive feedback that one or more events occur and provide notification of the events via playback of audio messages such as:

"Three stocks in your portfolio have reached your specified boundary—do you want to sell/buy etc?"

"Your lower stop losses have just kicked in and you are at risk of a margin call—do you want me to connect you to your broker?"

"Your front door has just been opened and the code for the cleaner has been entered"

"Your basement temperature has just fallen below 41 degrees—there is a risk of pipes freezing"

"Your alarm is fully activated"

"There is movement in your home—do you want us to call the Police?"

The call management resource 140 can be configured to perform continuous monitoring and playback useful messages to:

provide an up-to-date price of a stock every minute provide an up-to date score of a sports event every minute provide continuous weather updates, etc.

The call management resource 140 can be configured to send pre-configured messages and texts in response to receiving short code activation input from a respective user. For example, a user can dial a sequence of one or more digits on the phone to initiate playback of messages such as:

"Honey—I have to work late again—don't wait up"

"The plane is just taking off"

"We are 5 miles away please put the kippers on the grill"

Figure 5:
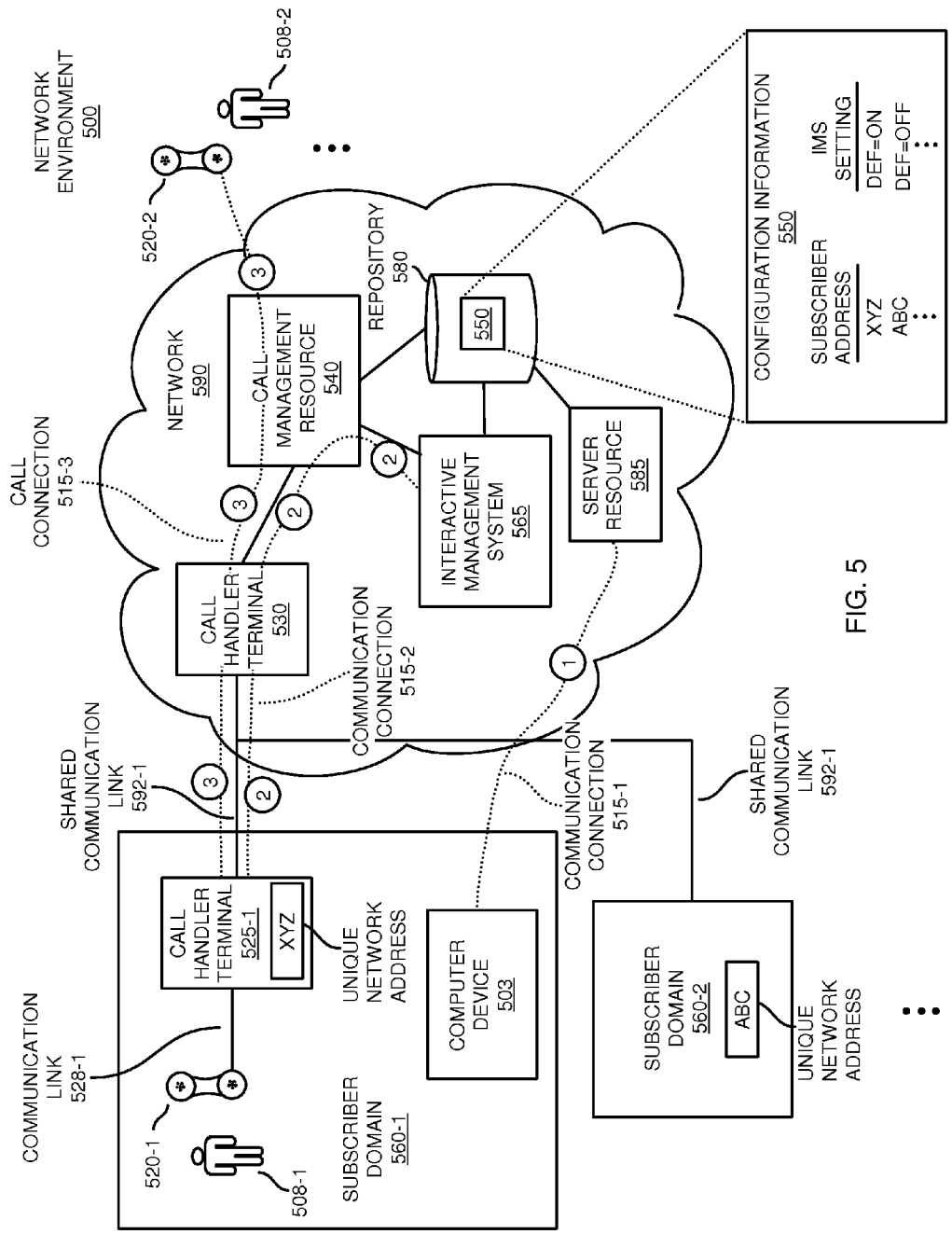
FIG. 5 is an example diagram illustrating a network environment including a call management resource according to embodiments herein.

FIG. 5 is an example diagram illustrating a network environment and connection to an interactive management system according to embodiments herein.

In the example embodiment as shown, the subscriber 508-1 provides input whether they would like to enable a respective default connection to an interactive management system 565 when activating a respective phone device 520-1 for use in the subscriber domain 560-1.

For example, to control their respective configuration settings, the subscriber 508-1 operates computer device 503 and communicates over communication connection 515-1 (such as the Internet) with server resource 585. The subscriber 508-1 uses computer device 503 to log onto a website to access a respective web page from server resource 585. The subscriber 508-1 inputs information in the respective web page whether they wish to set their phone device 520-1 to automatically connect to interactive management system 565 as a default condition upon initial use or activation of the phone device 520-1.

By further way of a non-limiting example, assume that a resource such as the call handler terminal 525-1 (such as a cable modem, embedded multimedia terminal adapter, etc.) and/or corresponding subscriber domain 560-1 has been assigned a unique network address of XYZ. The unique network address XYZ can be assigned to the subscriber domain 560-1, subscriber 520-1, specific one of multiple phone devices in the subscriber domain 560-1, etc.

When using computer device 503 to access server resource 585, the subscriber 508-1 provides identity information such as a username and password enabling the server resource 585 to identify subscriber 508-1. The server resource 585 has access to information associated with the subscriber 508-1 and maps the identity of the subscriber 508-1 to the corresponding unique network address XYZ assigned to the call handler terminal 525-1 (such as a cable modem, embedded multimedia terminal adapter, etc.) in subscriber domain 560-1.

Assume in this example that the subscriber 508-1 provides, via computer device 503, input to the server resource 585 indicating to automatically connect the phone device 520-1 to the interactive management system 565 as a default setting upon activation. In accordance with the input, the server resource 585 sets IMS setting default=ON for the interactive management system (IMS) setting as shown in configuration information 550. Server resource 585 stores the configuration information 550 such as address XYZ and default=ON in repository 580. This setting indicates that the subscriber 508-1 desires that the phone device 520-1 is automatically connected to the interactive management system 565 each time the phone device is initially activated.

In a similar manner that configuration information is retrieved and stored for subscriber 508-1, the server resource 585 is able to store setting information associated with each subscriber or subscriber domain. Thus, the server resource 585 creates a map of unique network address to default setting information. In this example embodiment, assume that the call handler terminal in subscriber domain 560-2 and/or corresponding subscriber is assigned unique network address ABC. Assume that the subscriber associated with subscriber domain 560-2 has set the interactive management system IMS setting to default=OFF. In such an instance, the server resource 585 stores the configuration information 550 such as address ABC and default=OFF in repository 580. The setting of OFF indicates the respective subscriber does not want the phone device to automatically connect to the interactive management system 560 upon activation.

Note that the subscriber domain 560-1, subscriber domain 560-2, etc., can be part of a same service group in a cable network environment. For example, in one non-limiting example embodiment, subscriber domain 560-1, subscriber domain 560-2, etc., and respective equipment share use of channels on communication link 592-1 to retrieve cable network television programs, video on demand, over-the-top content, etc. A respective call handler terminal in each subscriber domain enables a respective subscriber to communicate over shared communication link 592-1 with call handler terminal 530.

Assume that the call management resource 540 detects activation of a phone device 520-1 such as an off-hook condition (e.g., powering of a phone device prior to the subscriber dialing a phone number into the phone device) via communications from call handler terminal 530. For example, the phone device 520-1 in subscriber domain 560-1 is initially deactivated (such as on-hook). Call handler terminal 525-1 monitors a state of phone device 520-1. When a user activates the phone device 520-1 such as by lifting the phone device 520-1 off-hook, powering the phone device 520-1 to an ON state via pressing an appropriate button on the phone device 520-1, etc., the call handler terminal 525-1 senses use of the phone device 520-1 by the subscriber 508-1 or other user.

In one embodiment, communication link 528-1 such as a so-called land-line or wireless link supports communications between the phone device 520-1 and the call handler terminal 525-1. Note that use of call handler terminal 525-1 and call handler terminal 530 is shown by way of non-limiting example only and that any type of phone device outside of a respective cable network environment can be automatically connected to the interactive management system in response to detecting activation of the respective phone device.

In this example embodiment, upon detecting activation such as initial use of the phone device 520-1, the call handler terminal 525-1 communicates a notification signal (of the event) over a channel of shared communication link 592-1 to call handler terminal 530 (such as a cable modem termination system). By way of a non-limiting example, the transmitted notification signal from call handler terminal 525-1 over the shared communication link 592-1 to the call handler terminal can indicate the sensed off-hook condition as well as indicate the unique network address XYZ associated with the phone device 520-1. Call handler terminal 530 forwards the notification signal to call management resource 540 (such as a phone call handling switch), which manages connectivity of the phone device 520-1 with one or more resources in network environment 500.

In this example embodiment, the call management resource 540 receives notification of the off-hook condition as well as the unique network address XYZ. To determine how to handle the activation of the phone device 520-1, the call management resource 540 obtains configuration information 550 associated with unique network address XYZ. As mentioned, the configuration information 550 specifies whether a subscriber 508-1 associated with the phone device 520-1 subscribes to automatically being connected to the interactive management service 550 upon initial use (activation) of the phone device 520-1.

In this example embodiment, in response to receiving the notification signal, the call management resource 540 maps the unique network address XYZ to the IMS setting default=ON. In this instance, the subscriber 508-1 associated with the phone device 520-1 does subscribe to respective use of interactive management system 565, and as indicated by IMS setting default=ON, the subscriber 508-1 would like to be automatically connected to the interactive management system 565 upon activation of the phone device 520-1.

As specified by the configuration information 550 provided by the subscriber 508-1, and during a period in which the phone device 520-1 would normally play a dial tone prior to the subscriber 508-1 inputting a target number into the phone device 520-1 to establish a call connection with a corresponding called party, the call management resource 540 establishes a communication connection 515-2 between the phone device 520-1 and the interactive management system 565. As previously discussed, the interactive management system 565 executes commands as inputted by the subscriber 508-1 through the phone device 520-1 over the communication connection 515-2.

Accordingly, upon merely activating a phone device 520-1, without a need of dialing a sequence of numbers (on the phone device 520-1) to connect with a respective destination (such as another phone device 520-2, an interactive voice response system, etc.) the phone device 508-1 activated by the subscriber 508-1 or other user is automatically connected to a respective interactive management system 565 as a default setting as specified by the subscriber.

In accordance with a further non-limiting example embodiment, if desired, the subscriber 508-1 (or other user) activating the phone device 520-1 (such as by powering the phone device 520-1, lifting it off-hook, etc.) can be notified about the communication connection 515-2 and ability to use the interactive management system 565. For example, in one embodiment, in response to the activation of the phone device 520-1, the phone device 520-1 receives a message from the interactive management system 565 (or other suitable resource) to play back the audio or text phrase "You are now connected to the interactive management system" on a respective speaker of the phone device 520-1 to a user. Any suitable notification such as playback of a beep, message, etc., on the phone device 520-1 can be used to notify the subscriber 508-1. This notifies the subscriber 508-1 that the user is now able to perform any of the different types of control functions as discussed herein.

Thus, in one embodiment, in lieu of transmitting a conventional dial-tone signal over the communication connection 515-1 to the phone device 520-1 for playback, the interactive management system 565 or other suitable resource can be configured to provide a notification over the communication connection 515-1 to the phone device 520-1 indicating that the phone device 520-1 has been connected to the interactive management system 565.

In one embodiment, even though the subscriber 508-1 is connected to the interactive management system 565 as a default setting, the subscriber 508-1 can dial a respective target phone number to communicate with a called party in network environment 500. For example, while the phone device 520-1 is connected to the interactive management system 565 via the communication connection 515-2, in response to detecting input from the user of phone device 520-1 dialing the target number on the phone device 520-1, embodiments herein include terminating the communication connection 515-2 between the phone device 520-1 and the interactive management system 160, and establishing a call connection 515-3 between the phone device 520-1 and the corresponding called party (e.g., user 508-2) in the network environment 500.

Thus, a subscriber 508-1 can be connected directly to the interactive management system 565 as a default to activating a phone device 520-1, but make an outbound call as usual to a target phone number (e.g., to phone device 520-2) without having to input a special code to switchover to using the phone device 520-1 in a standard phone to establish a call connection with a called party.

As an alternative example embodiment, as mentioned, note that the call management resource 540 or other suitable resource can initiate playback of a standard dial tone on the phone device 520-1 to indicate that the subscriber 508-1 is able to make an outbound call to a called party even though the phone device 520 is communicatively coupled to the interactive management system 565 via the communication connection 515-2. In such an instance, even though a dial-tone is played back on a speaker of the phone device 520-1, because the phone device 520-1 is connected to the interactive management system 565 via communication connection 515-2, the user of the phone device 520-1 can merely speak into the phone device 520-1 (or dial a sequence of buttons on the phone device 520-1) to communicate a respective command to the interactive management system 565 to carry out a desired function.

Play back of the dial tone is optional.

If desired, the call management resource 540 and/or interactive management system 565 can require the subscriber 508-1 to provide appropriate input to notify the interactive management system 565 or call management resource 540 to switchover to a conventional phone mode in which a subsequently inputted sequence of numbers dialed on the phone device 520-1 is a call is to be placed with a target phone device such as phone device 520-2.

In one non-limiting example embodiment, via the default communication connection 515-2 created between the phone device 520-1 and the interactive management system 565, the user or subscriber 508-1 inputs one or more commands (e.g., text-based, voice-based, etc.) into the phone device 520-1. The communication connection 515-1 conveys the commands to the interactive management system 565. The interactive management system 565 translates the received input commands into appropriate machine executable commands. Thereafter, the interactive management system 565 or other suitable resource executes the machine executable commands to carry out one or more operation as specified by the commands.

In one embodiment, the interactive management system directs the machine-based commands to an appropriate resource to carry out the respective command. Thus, the functions controlled by the interactive management system 565 are not limited to providing requested information over the communication connection 515-2 to the phone device 520-1.

By way of further non-limiting example, the interactive management system 565 can perform additional types of remotely executed functions with respect to the interactive management system 565 such as control a heat setting of a subscriber domain 560-1 (such as a house) to a temporary as specified by the subscriber over the phone device 520-1. For example, the subscriber 508-1 can speak the command "Set house temperature to 72 degrees" into phone device 520-1. The phone device 520-1 transmits the message over communication connection 515-2 to the interactive management system 565. In response to receiving this command, the interactive management system 565 communicates over an appropriate link to a temperature controller in the subscriber domain 560-1 to set the temperature of the subscriber domain 560-1 to the appropriate setting.

As another example embodiment, via commands from phone device 520-1 to the interactive management system 565, the user may input one or more command to control a respective set-top box disposed in the subscriber domain. For example, the user may input a command indicating to tune the set-top box to a particular channel. In response to receiving the command, in a similar manner as previously discussed, the interactive management system communicates over shared communication link 592-1 to a set-top box disposed in the subscriber domain 560-1 to tune the set-top box to the requested channel. Accordingly, the subscriber 508-1 is able to merely activate (e.g., turn it ON) his phone device 520-1 and speak a command to carry out an action such as to set the tuning of the set-top box.

In yet further embodiments, note that a subscriber 508-1 may be amenable to receiving advertisements over communication connection 515-2 prior to being connected to interactive management system 565 or prior to being allowed to use the interactive management system 565 to carry respective one or more operations. For example, the call management resource 560 (or other suitable resource) can be configured to initiate playback of one or more voice-based advertisements to the phone device 520-1 over the communication connection 515-2 prior to providing the subscriber 520-1 access to the interactive management system 565 or establishing the call connection 515-3 with the corresponding called party. In such an instance, the subscriber 508-1 may be charged a lower fee or no fee to use the interactive management system 565 as a default upon activation of a respective phone device.

Figure 6:
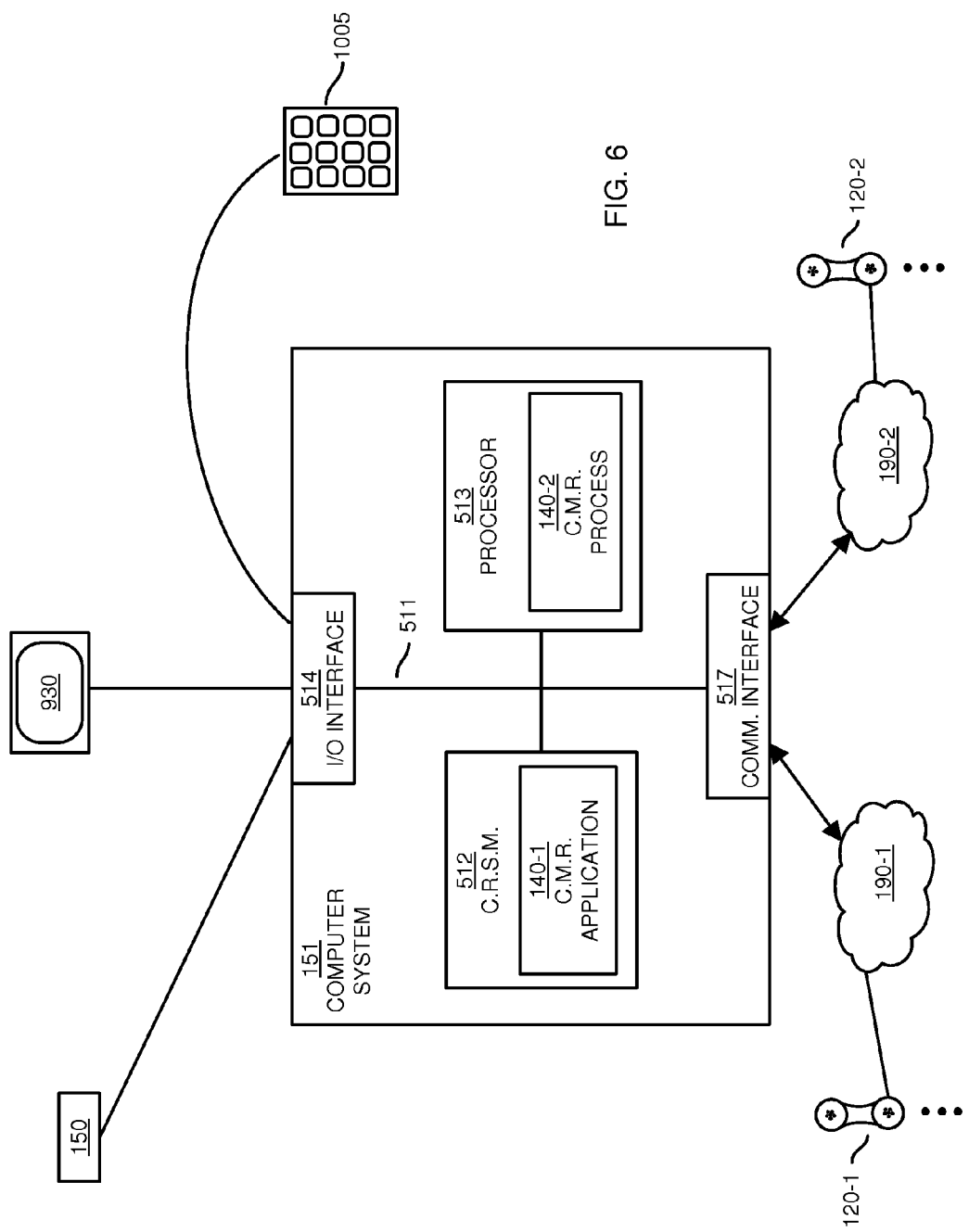
FIG. 6 is an example diagram illustrating a computer architecture executing one or more embodiments as discussed herein.

FIG. 6 is an example diagram illustrating a computer architecture in which to execute one or more embodiments as discussed herein.

Any of the different processing techniques can be implemented via execution of software code on a computer system.

For example, as shown, computer system 151 of the present example can include an interconnect 511 that couples computer readable storage media 512 such as a non-transitory type of media (i.e., any type of physical hardware storage medium) in which digital information can be stored and retrieved. The computer system 912 can further include one or more processor resource 513 (e.g., one or more processor devices), I/O interface 514, communications interface 515, etc.

As its name suggests, I/O interface 514 provides connectivity to external resources such as a repository including configuration settings 150 and, if present, other devices such as a keypad 1005, display 930, a computer mouse, etc.

Computer readable storage medium 512 can be any hardware storage device (e.g., physical storage such as a physical device or devices) such as memory, optical storage, hard drive, floppy disk, etc. In one embodiment, the computer readable storage medium 512 stores instructions and/or data.

Communications interface 515 enables the computer system 151 and one or more processor resource 513 to communicate over a resource such as networks 190 to receive control input from one or more of communication devices 120. I/O interface 514 enables processor resource 513 to access configuration settings 150 and process the control input as discussed herein.

As shown, computer readable storage media 512 can be encoded with call management resource application 140-1 (e.g., software, firmware, etc.) executed by processor resource 513. Analyzer resource application 140-1 can be configured to include instructions to implement any of the operations as discussed herein.

During operation of one embodiment, processor resource 513 accesses computer readable storage media 512 via the use of interconnect 511 in order to launch, run, execute, interpret or otherwise perform the instructions in call management resource application 140-1 stored on computer readable storage medium 512.

Execution of the call management resource application 140-1 produces processing functionality such as call management resource process 140-2 in processor resource 513. In other words, the call management resource process 140-2 associated with processor resource 513 represents one or more aspects of executing call management resource application 140-1 within or upon the processor resource 513 in the computer system 151.

Those skilled in the art will understand that the computer system 151 can include other processes and/or software and hardware components, such as an operating system that controls allocation and use of hardware resources to execute call management resource application 140-1.

In accordance with different embodiments, note that computer system may be any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device.

The computer system 151 may reside at any location or can be included in any suitable resource in network environment 100 to implement functionality as discussed herein.

Functionality supported by the different resources will now be discussed via the flowchart in FIGS. 7 and 8. Note that the steps in the flowcharts below can be executed in any suitable order.

Figure 7:
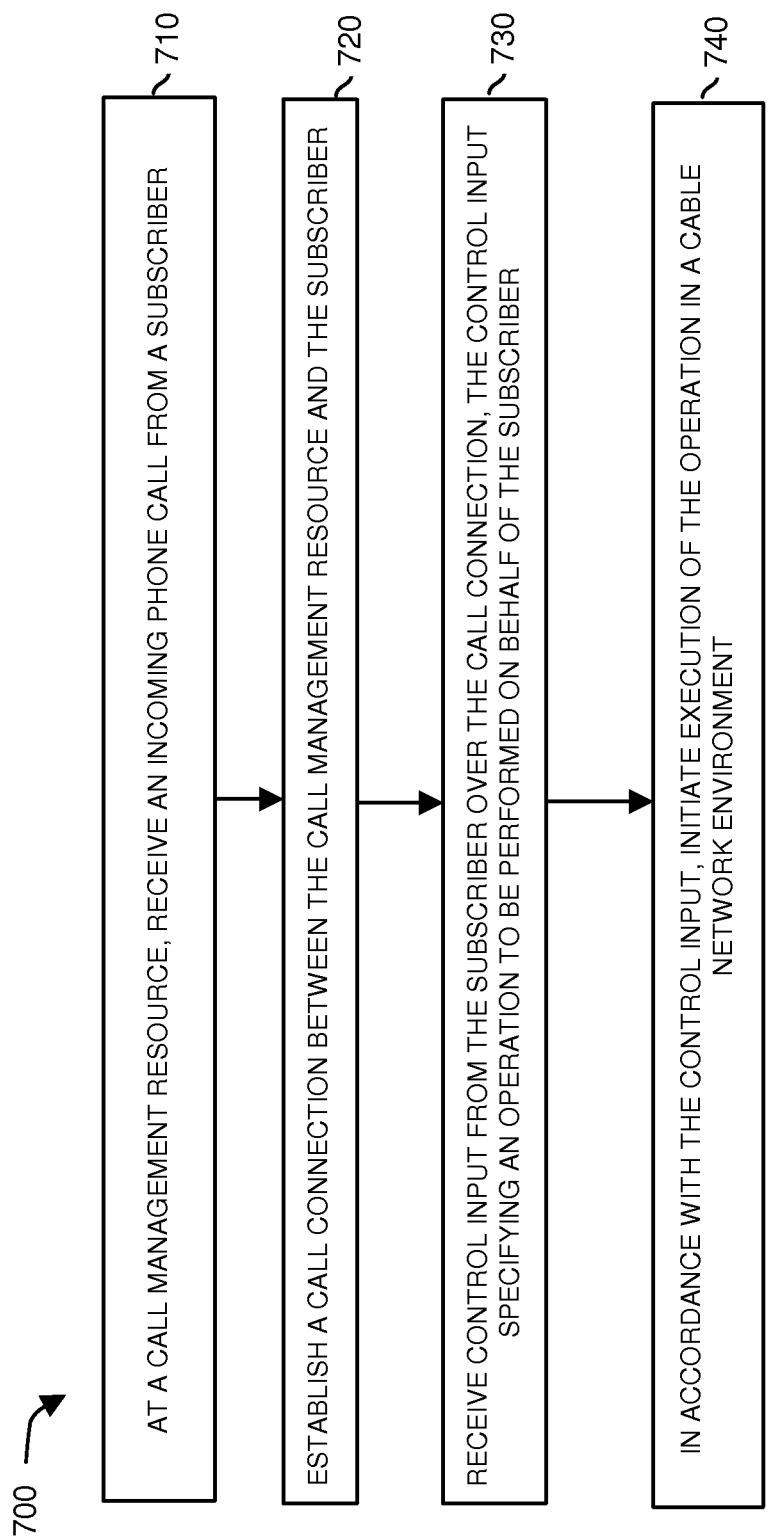
FIG. 7 is a flowchart illustrating an example method of providing control capability according to embodiments.

FIG. 7 is a flowchart 700 illustrating an example method of providing control capability according to embodiments. Note that there will be some overlap with respect to concepts as discussed above.

In processing block 710, the call management resource 140 receives an incoming phone call from a subscriber 108-1.

In processing block 720, the call management resource 140 and/or network 190-1 establishes a call connection with the subscriber 108-1.

In processing block 730, the call management resource 140 receives control input from the subscriber 108-1 over the call connection. The control input specifies at least one operation to be performed on behalf of the subscriber 108-1 in the cable network environment.

In processing block 740, in accordance with the control input received from the subscriber, the call management resource initiates execution of the operation in the cable network environment.

Figure 8:
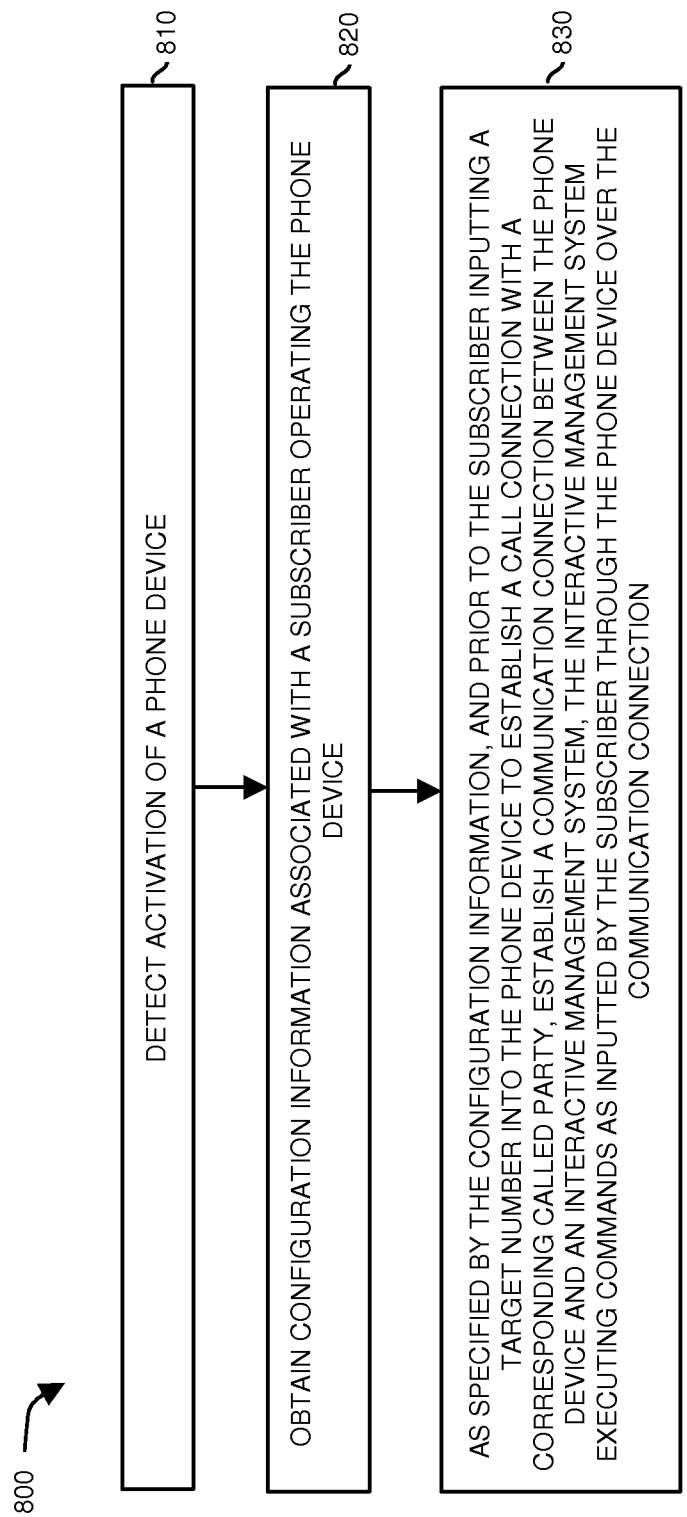
FIG. 8 is a flowchart illustrating an example method of providing control capability using a phone device according to embodiments.

FIG. 8 is a flowchart 800 illustrating an example method of providing control capability according to embodiments. Note that there will be some overlap with respect to concepts as discussed above.

In processing block 810, the call management resource 540 detects activation of a phone device 520-1.

In processing block 820, the call management resource 540 obtains configuration information 550 associated with a subscriber 508-1 (user) operating the phone device 520-1.

In processing block 830, as specified by the configuration information 550, and prior to the subscriber 508-1 inputting a target number into the phone device 520-1 to establish a call connection with a corresponding called party such as user 508-2, the call management resource 540 establishes a communication connection 515-2 between the phone device 520-1 and an interactive management system 565. The interactive management system 565 executes commands as inputted by the subscriber 508-1 through the phone device 520-1 over the communication connection 515-2.

Note again that techniques herein are well suited for use in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:

detecting activation of a phone device;

obtaining configuration information associated with a subscriber operating the phone device; and as specified by the configuration information indicating to establish a communication connection between the phone device and an interactive management system upon activation of the phone device prior to the subscriber inputting a target number into the phone device to establish a call connection with a corresponding called party, establishing the communication connection between the phone device and the interactive management system prior to the subscriber inputting the target number into the phone device, the interactive management system executing commands as inputted by the subscriber through the phone device over the communication connection;

at a call management resource in a cable network environment:

detecting the activation of the phone device;

identifying a unique network address assigned to the phone device; and mapping the unique network address to the configuration information indicating to establish the communication connection between the phone device and the interactive management system upon activation of the phone device prior to the subscriber inputting the target number into the phone device.

2. The method as in claim 1, wherein detecting activation of the phone device includes:

detecting an off-hook condition associated with the phone device.

3. The method as in claim 2, wherein the off-hook condition occurs in response to the subscriber powering the phone device, the off-hook condition occurring prior to the target number being inputted to the phone device by the subscriber.

4. The method as in claim 1 further comprising:

initiating playback of advertisements on the phone device via communications over the communication connection prior to providing the subscriber access to the interactive management system or establishing the call connection with the corresponding called party.

5. The method as in claim 1, wherein the interactive management system is an interactive voice response system, the method further comprising:

transmitting communications from the interactive voice response system to the phone device over the communication connection in response to receipt of voice-based commands from the subscriber speaking into the phone device.

6. The method as in claim 1 further comprising:

prior to detecting an event of detecting the activation of the phone device:

providing the subscriber access to a web page;

receiving the configuration information from the subscriber via the web page; and storing the configuration information in a repository, the configuration information accessible to a switch that establishes the communication connection between the phone device and the interactive management system.

7. The method as in claim 1 further comprising:

conveying a command from the subscriber operating the phone device over the communication connection to the interactive management system, the interactive management system generating a response to the command; and conveying the response over the communication connection to the phone device.

8. The method as in claim 1 further comprising:

subsequent to establishing the communication connection between the phone device and the interactive management system, receiving the target number inputted by the subscriber; and making an outbound call from the phone device to the target number without the subscriber having to input a command to switchover to using the phone device in a standard phone mode to establish the call connection with the corresponding called party.

9. The method as in claim 1 further comprising:

in response to receiving the target number inputted by the subscriber while the communication connection is established between the phone device and the interactive management system, initiating the call connection with the corresponding called party.

10. A method comprising:

detecting activation of a phone device;

obtaining configuration information associated with a subscriber operating the phone device; and as specified by the configuration information indicating to establish a communication connection between the phone device and as interactive management system upon activation of the phone device prior to the subscriber inputting a target number into the phone device to establish a call connection with a corresponding called party, establishing the communication connection between the phone device and the interactive management system prior to the subscriber inputting the target number into the phone device, the interactive management system executing commands as inputted by the subscriber through the phone device over the communication connection; and wherein detecting the activation of the phone device occurs at a switch in a cable network environment, the switch detecting an off-hook condition of the phone device and establishing the communication connection with the interactive management system.

11. The method as in claim 10 further comprising:

at the switch, while the phone device is connected to the interactive management system via the communication connection, in response to detecting input from the user dialing the target number on the phone device:

terminating the communication connection between the phone device and the interactive management system; and establishing a call connection between the phone device and the corresponding called party in the communication network.

12. A method comprising:

detecting activation of a phone device;

obtaining configuration information associated with a subscriber operating the phone device;

as specified by the configuration information indicating to establish a communication connection between the phone device and an interactive management system upon activation of the phone device prior to the subscriber inputting a target number in the phone device to establish a call connection with a corresponding called party, establishing the communication connection between the phone device and the interactive management system prior to the subscriber inputting the target number into the phone device, the interactive management system executing commands as inputted by the subscriber through the phone device over the communication connection;

in lieu of transmitting a conventional dial-tone signal over the communication connection to the phone device for playback, providing a notification over the communication connection to the phone device; the notification indicating that the phone device has been connected to the interactive management system; and while the phone device is connected to the interactive management system via the communication connection, in response to detecting input from the user dialing the target number on the phone device:

terminating the communication connection between the phone device and the interactive management system; and establishing a call connection between the phone device and the corresponding called party in the communication network.

13. A computer system comprising:

at least one processor device; and a hardware storage resource coupled to the at least one processor device, the hardware storage resource storing instructions that, when executed by the at least one processor device, cause the at least one processor device to perform operations of:

detecting activation of a phone device;

obtaining configuration information associated with a subscriber operating the phone device; and as specified by the configuration information, and prior to the subscriber inputting a target number into the phone device to establish a call connection with a corresponding called party, establishing a communication connection between the phone device and an interactive management system, the interactive management system executing commands as inputted by the subscriber through the phone device over the communication connection;

prior to receiving the target number inputted by the subscriber, establishing the communication connection between the phone device and the interactive management system using a unique network address assigned to a subscriber domain of the subscriber; and establishing the call connection with the corresponding called party in response to the subscriber inputting the target number into the phone device while the phone device is connected to the interactive management system via the communication connection.

14. The computer system as in claim 13, wherein the at least one processor device further supports operations of:

detecting activation of the phone device;

identifying a unique network address associated with the phone device; and mapping the unique network address associated with the phone device to the configuration information.

15. The computer system as in claim 13, wherein detecting activation of the phone device includes:

detecting an off-hook condition associated with the phone device.

16. The computer system as in claim 13, wherein the off-hook condition occurs in response to the subscriber powering the phone device, the off-hook condition occurring prior to the target being inputted to the phone device by the subscriber.

17. The computer system as in claim 13, wherein the at least one processor device further supports operations of:

initiating playback of advertisements via communications to the phone device over the communication connection prior to providing the subscriber access to the interactive management system or establishing the call connection with the corresponding called party.

18. The computer system as in claim 13, wherein detecting the activation of the phone device occurs at a switch in a cable network environment, the switch detecting an off-hook condition of the phone device and establishing the communication connection.

19. The computer system as in claim 18, wherein the at least one processor device further supports operations of:

while the phone device is connected to the interactive management system via the communication connection, in response to detecting input from the user dialing the target number on the phone device:

terminating the communication connection between the phone device and the interactive management system; and establishing a call connection between the phone device and the corresponding called party in the communication network.

20. The computer system as in claim 13, wherein the at least one processor device further supports operations of:

transmitting communications from the interactive management system to the phone device over the communication connection in response to receipt of voice-based commands from the subscriber speaking into the phone device.

21. The computer system as in claim 13, wherein the at least one processor device further supports operations of:

in lieu of transmitting a conventional dial-tone signal over the communication connection to the phone device for playback, providing a notification over the communication connection to the phone device, the notification indicating that the phone device has been connected to the interactive management system.

22. The computer system as in claim 21, wherein the at least one processor device further supports operations of:

while the phone device is connected to the interactive management system via the communication connection, in response to detecting input from the user dialing the target number on the phone device:

terminating the communication connection between the phone device and the interactive management system; and establishing a call connection between the phone device and the corresponding called party in the communication network.

23. The computer system as in claim 13, wherein establishing the communication connection between the phone device and the interactive management system using the unique network address further comprises:

mapping the unique network address assigned to the subscriber domain to obtain the configuration information associated with the subscriber operating the phone device.

24. A method comprising:

detecting activation of a phone device;

obtaining configuration information associated with a subscriber operating the phone device; and as specified by the configuration information indicating to establish a communication connection between the phone device and an interactive management system upon activation of the phone device prior to the subscriber inputting a target number into the phone device to establish a call connection with a corresponding called party, establishing the communication connection between the phone device and the interactive management system prior to the subscriber inputting the target number into the phone device, the interactive management system executing the communication connection;

wherein detecting activation of the phone device includes:
  detecting an off-hook condition associated with the phone device, the off-hook condition occurring prior to the target number being inputted to the phone device by the subscriber, the method further comprising:
in lieu of transmitting a conventional dial-tone signal over the communication connection to the phone device for playback, providing an alternative audible notification over the communication connection to the phone device, the alternative audible notification indicating to the subscriber that the phone device has been connected to the interactive management system;
transmitting a command from the subscriber operating the phone device over the communication connection to the interactive management system, the interactive management system generating a response to the command;
receiving the response over the communication connection to the phone device;
in response to detecting input from the user dialing the target number on the phone device:
  terminating the communication connection between the phone device and the interactive management system; and
  establishing the call connection between the phone device and the corresponding called party.

* * * * *